US009004037B2

(12) United States Patent
Muscas

(10) Patent No.: US 9,004,037 B2
(45) Date of Patent: Apr. 14, 2015

(54) PISTON ASSEMBLY FOR INTERNAL COMBUSTION ENGINE

(71) Applicant: Federal Mogul Corporation, Southfield, MI (US)

(72) Inventor: Floin Muscas, Novi, MI (US)

(73) Assignee: Federal-Mogul Corporation, Southfield, MI (US)

( * ) Notice: Subject to any disclaimer, the term of this patent is extended or adjusted under 35 U.S.C. 154(b) by 0 days.

(21) Appl. No.: 13/772,022

(22) Filed: Feb. 20, 2013

(65) Prior Publication Data

US 2013/0213340 A1    Aug. 22, 2013

Related U.S. Application Data

(60) Provisional application No. 61/600,975, filed on Feb. 20, 2012.

(51) Int. Cl.
*F02F 3/00*    (2006.01)
*F16J 1/18*    (2006.01)
*F16J 1/00*    (2006.01)

(52) U.S. Cl.
CPC .................. *F02F 3/0023* (2013.01); *F16J 1/18* (2013.01); *F16J 1/008* (2013.01)

(58) Field of Classification Search
CPC ........... F02F 3/00; F02F 3/003; F02F 3/0084; F02F 3/0015; F02F 3/0076; F02F 3/0023; F02F 3/24; F02F 3/28
USPC ........... 92/158, 189, 237, 160, 208, 220, 238; 29/888.04; 123/193.4, 193.1, 193.6
See application file for complete search history.

(56) References Cited

U.S. PATENT DOCUMENTS

| 1,358,825 | A | 11/1920 | Busby |
| 1,475,359 | A | 11/1923 | Woodruff |
| 1,598,915 | A | 9/1926 | Keyes |
| 1,680,917 | A | 8/1928 | Sloan et al. |
| 1,711,425 | A | 4/1929 | Pratt |

(Continued)

FOREIGN PATENT DOCUMENTS

| FR | 487502 A | 7/1918 |
| GB | 833320 A | 4/1960 |

OTHER PUBLICATIONS

International Search Report, mailed Jun. 20, 2013 (PCT/US2013/026790).

*Primary Examiner* — Noah Kamen
*Assistant Examiner* — Long T Tran
(74) *Attorney, Agent, or Firm* — Robert L. Stearns; Dickinson Wright, PLLC

(57) ABSTRACT

A piston assembly includes a piston having a crown with an upper combustion surface with a cylindrical outer surface extending downwardly from the upper combustion surface. A pair of pin bosses depends from the crown to a pair of pin bores having generally cylindrical bearing surfaces aligned along a pin bore axis with a top wall portion extending between the pin bosses. The top wall portion has a concave bearing surface forming a continuous concave bearing surface with the pin bores. A separate skirt is fixed to the piston against relative movement. At least one rib extends upwardly from the top wall portion of the piston on opposite sides of the pin bore axis to a lower wall surface of the crown. The at least one rib joins the crown to the top wall portion to provide structural support to the top wall portion against unwanted deflection.

16 Claims, 9 Drawing Sheets

(56) References Cited

U.S. PATENT DOCUMENTS

| | | | |
|---|---|---|---|
| 1,758,543 A | 5/1930 | Talbot | |
| 1,938,826 A | 12/1933 | Frank | |
| 1,939,959 A | 12/1933 | Dick | |
| 1,940,629 A | 12/1933 | Mahle | |
| 1,948,405 A | 2/1934 | Wagner | |
| 1,990,393 A | 2/1935 | Weller | |
| 1,990,815 A | 2/1935 | Clark | |
| 2,040,293 A | 5/1936 | Chandler | |
| 2,056,302 A | 10/1936 | Smallwood et al. | |
| 3,703,126 A * | 11/1972 | Haug | 92/186 |
| 4,073,220 A | 2/1978 | Guenther | |
| 4,253,430 A | 3/1981 | Garter et al. | |
| 4,270,494 A | 6/1981 | Garter et al. | |
| 5,331,932 A * | 7/1994 | Watanabe et al. | 123/193.6 |
| 5,913,960 A * | 6/1999 | Fletcher-Jones | 92/219 |
| 6,155,157 A * | 12/2000 | Jarrett | 92/186 |
| 6,170,443 B1 | 1/2001 | Hofbauer | |
| 6,318,243 B1 * | 11/2001 | Jones | 92/189 |
| 6,401,680 B1 * | 6/2002 | Zhu et al. | 123/193.6 |
| 6,477,941 B1 | 11/2002 | Zhu et al. | |
| 6,499,387 B2 * | 12/2002 | Bedwell | 92/216 |
| 6,571,684 B1 | 6/2003 | Nov et al. | |
| 6,588,320 B2 * | 7/2003 | Gaiser et al. | 92/231 |
| 6,651,549 B2 | 11/2003 | Zhu et al. | |
| 6,715,457 B1 | 4/2004 | Shoptaw et al. | |
| 6,973,723 B2 * | 12/2005 | Cagney et al. | 29/888.047 |
| 7,647,911 B2 * | 1/2010 | Schneider et al. | 123/193.4 |
| 7,735,834 B2 | 6/2010 | Hofbauer | |
| 8,336,446 B2 * | 12/2012 | Frank et al. | 92/237 |
| 2007/0235003 A1 * | 10/2007 | Cagney et al. | 123/279 |
| 2008/0295683 A1 * | 12/2008 | Wagner | 92/186 |
| 2010/0050861 A1 * | 3/2010 | Azevedo et al. | 92/158 |
| 2010/0050978 A1 | 3/2010 | Hofbauer | |
| 2010/0101527 A1 * | 4/2010 | Gniesmer | 123/193.6 |
| 2010/0108017 A1 | 5/2010 | Bing et al. | |
| 2010/0229836 A1 | 9/2010 | Hofbauer et al. | |
| 2010/0326394 A1 | 12/2010 | Hofbauer | |
| 2011/0107997 A1 * | 5/2011 | Muscas et al. | 123/193.6 |
| 2013/0008307 A1 * | 1/2013 | Will et al. | 92/172 |
| 2013/0008406 A1 | 1/2013 | Hofbauer | |

* cited by examiner

PISTON ASSEMBLY FOR INTERNAL COMBUSTION ENGINE

CROSS-REFERENCE TO RELATED APPLICATION

This application claims the benefit of U.S. Provisional Application Ser. No. 61/600,975, filed Feb. 20, 2012, which is incorporated herein by reference in its entirety.

BACKGROUND OF THE INVENTION

1. Technical Field

This invention relates generally to internal combustion engines, and more particularly to piston for internal combustion engines.

2. Related Art

It is known to provide piston assemblies in two-cycle engine applications with a piston head having a cylindrically continuous skirt fixed thereto to allow the intake and exhaust ports to open and close in response to reciprocation of the skirt as needed throughout a full stroke of the piston. Due to extreme thrust and anti-thrust forces experienced by the piston skirt across opposite sides a wrist pin, the piston assemblies typically have separately constructed reinforcement components attached thereto. Although the reinforcement components can be effective, they are typically constructed of steel, and thus, add weight to the finished piston assemblies, and further, add complexity to the manufacturing process, thereby increasing the cost associated with the manufacture of the piston.

SUMMARY OF THE INVENTION

In accordance with one aspect of the invention, a piston assembly for an internal combustion engine is provided. The piston assembly includes a piston having a crown with an upper combustion surface and an undercrown surface opposite said upper combustion surface with a cylindrical outer surface extending downwardly from the upper combustion surface. The piston further includes a pair of pin bosses depending from the crown to provide a pair of pin bores having generally cylindrical bearing surfaces aligned along a pin bore axis with a top wall portion extending between the pin bosses. The top wall portion has a concave bearing surface forming a continuous concave bearing surface with the pin bores. Further yet, the piston assembly includes a skirt constructed as a separate piece of material from the piston. The skirt is fixed to the piston against relative movement and has a cylindrical wall with inner and outer cylindrical surfaces. The piston further includes at least one rib extending upwardly from the top wall portion on opposite sides of the pin bore axis to a lower wall surface of the crown, wherein the at least one rib joining the crown to the top wall portion provides structural support to said top wall portion against unwanted deflection.

In accordance with another aspect of the invention, the piston further includes a pair of the ribs extending along each of the opposite sides of the pin bore axis.

In accordance with another aspect of the invention, the piston further includes at least one laterally extending web extending between the pin bosses. The at least one rib extends upwardly from the at least one laterally extending web to the lower wall surface of the crown.

In accordance with another aspect of the invention, the at least one laterally extending web extends along a plane passing through the pin bore axis.

In accordance with another aspect of the invention, the at least one laterally extending web has a convexly contoured outer surface.

In accordance with another aspect of the invention, the inner surface of the skirt abuts the convexly contoured outer surface of the at least one laterally extending web.

In accordance with another aspect of the invention, the pin bosses have cylindrical, convex outer surfaces forming a smooth cylindrical continuation of the convexly contoured outer surface of the at least one laterally extending web.

In accordance with another aspect of the invention, the inner surface of the skirt abuts the convexly contoured outer surface of the at least one laterally extending web and the cylindrical, convex outer surfaces of the pin bosses.

In accordance with another aspect of the invention, the at least one laterally extending web includes a pair of laterally extending webs, wherein the pair of laterally extending webs are diametrically opposite one another on opposite sides of the pin bore axis.

In accordance with another aspect of the invention, the convexly contoured outer surfaces of the pair of laterally extending webs form a smooth cylindrical continuation of the cylindrical, convex outer surfaces of the pin bosses.

In accordance with another aspect of the invention, the inner surface of the skirt abuts the convexly contoured outer surfaces of the pair of laterally extending webs and the cylindrical, convex outer surfaces of the pin bosses.

In accordance with another aspect of the invention, the piston is a monolithic piece of material.

In accordance with another aspect of the invention, the piston includes an upper portion and a lower portion, wherein the upper and lower portions are constructed as separate pieces of material and subsequently joined together.

BRIEF DESCRIPTION OF THE DRAWINGS

These and other aspects, features and advantages of the present invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
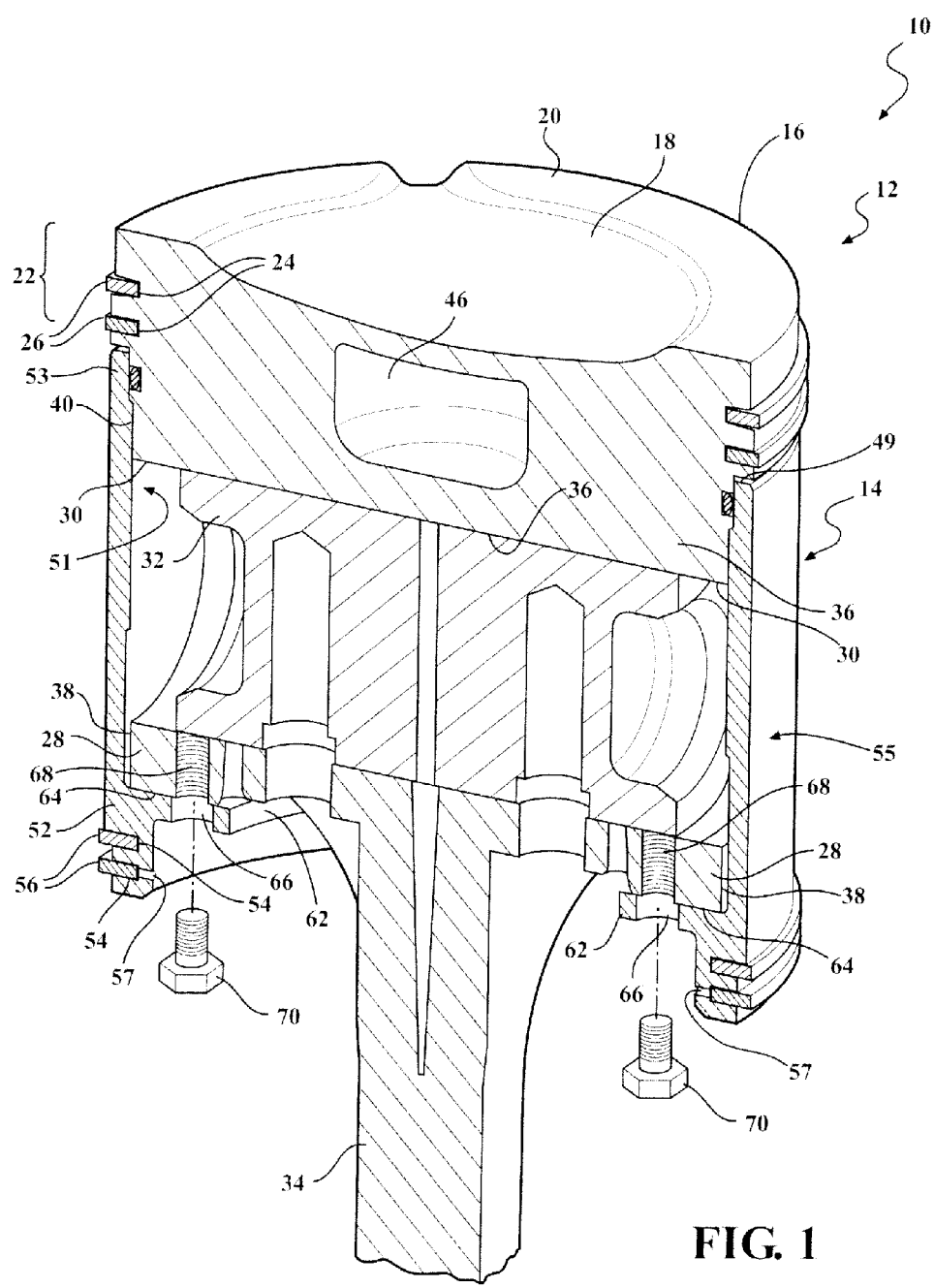
FIG. 1 is a cross-sectional perspective view of a piston assembly constructed in accordance with one aspect of the invention.
Figure 2:
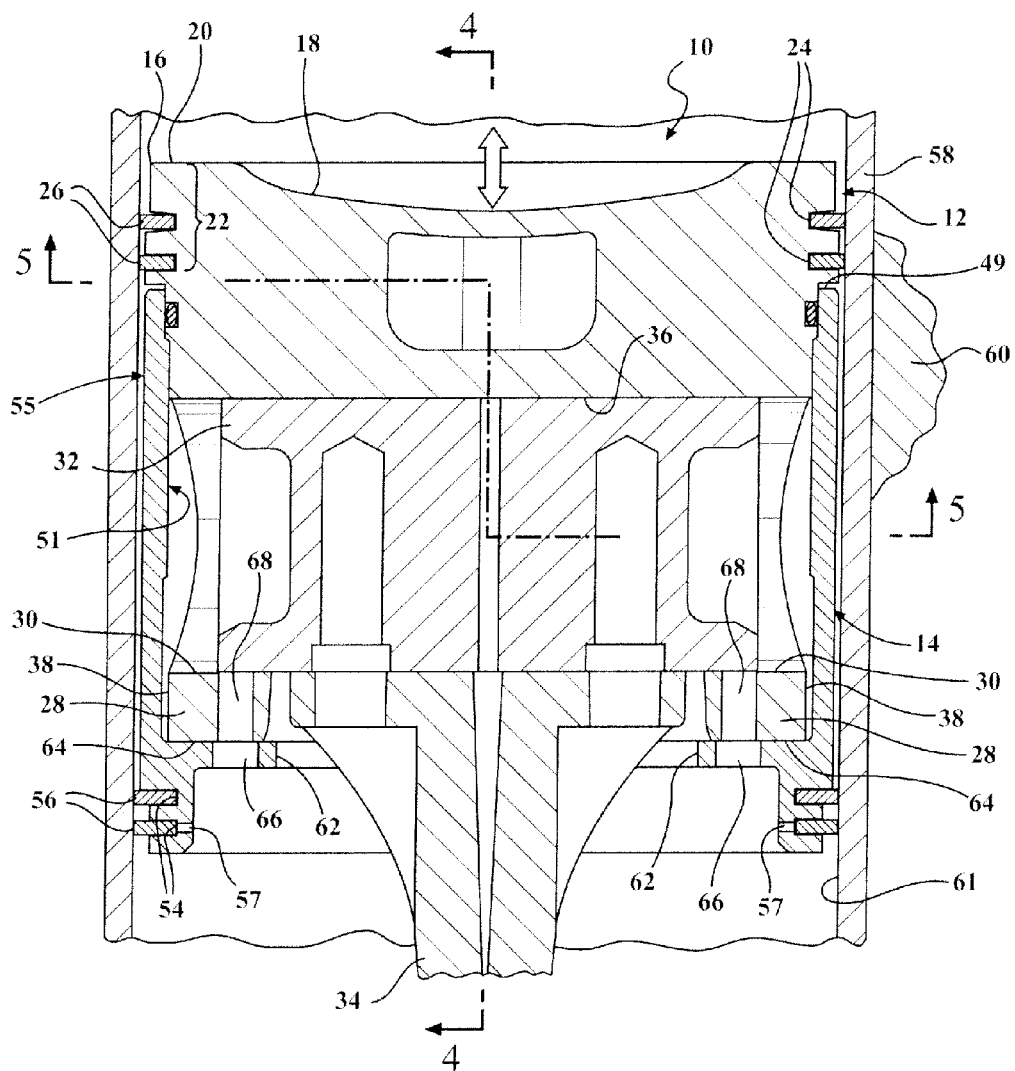
FIG. 2 is cross-sectional side view taken generally along a pin bore axis of the piston of FIG. 1 with the piston shown disposed in a cylinder bore.
Figure 3:
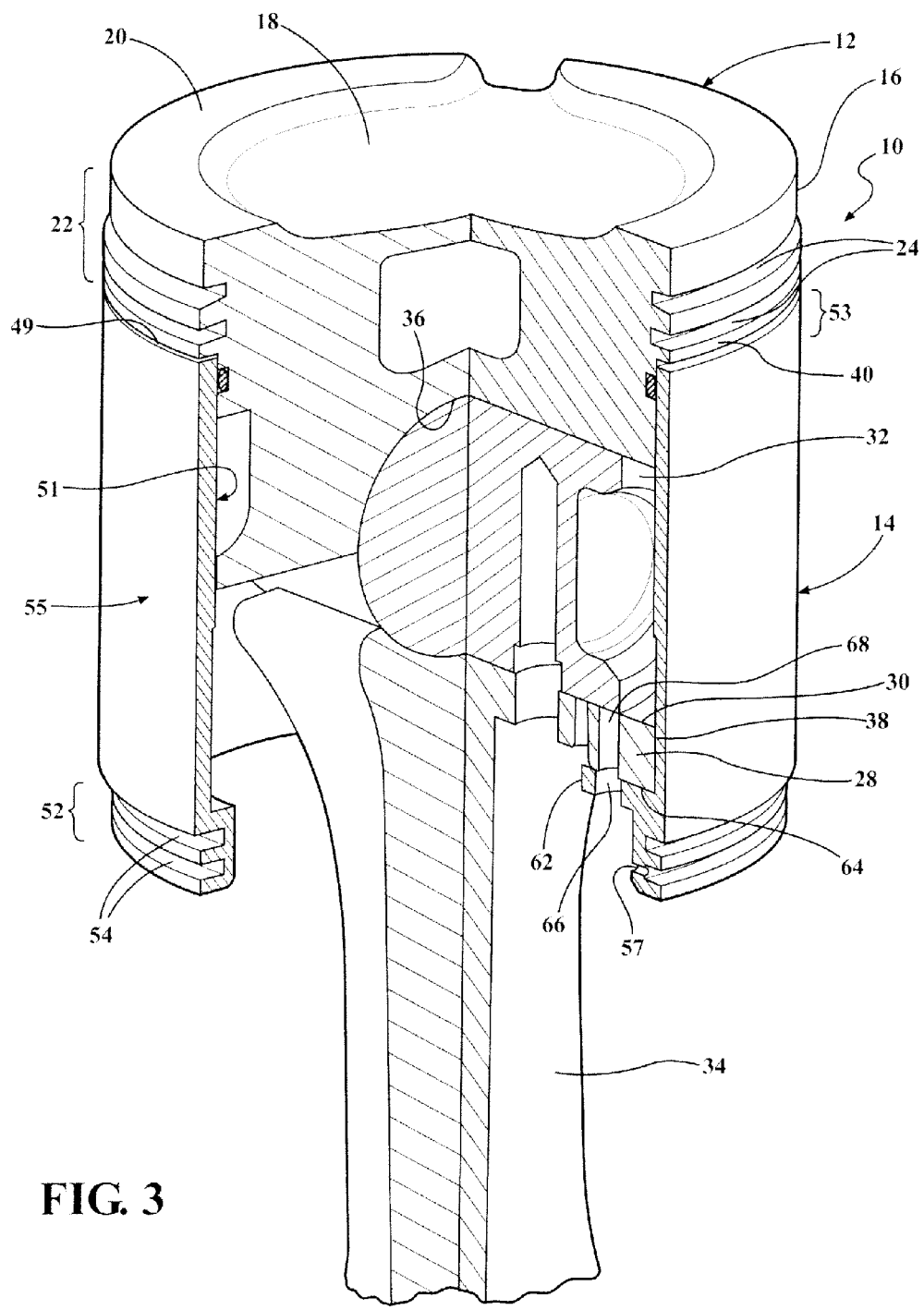
FIG. 3 is a partially section view of the piston of FIG. 1.
Figure 4:
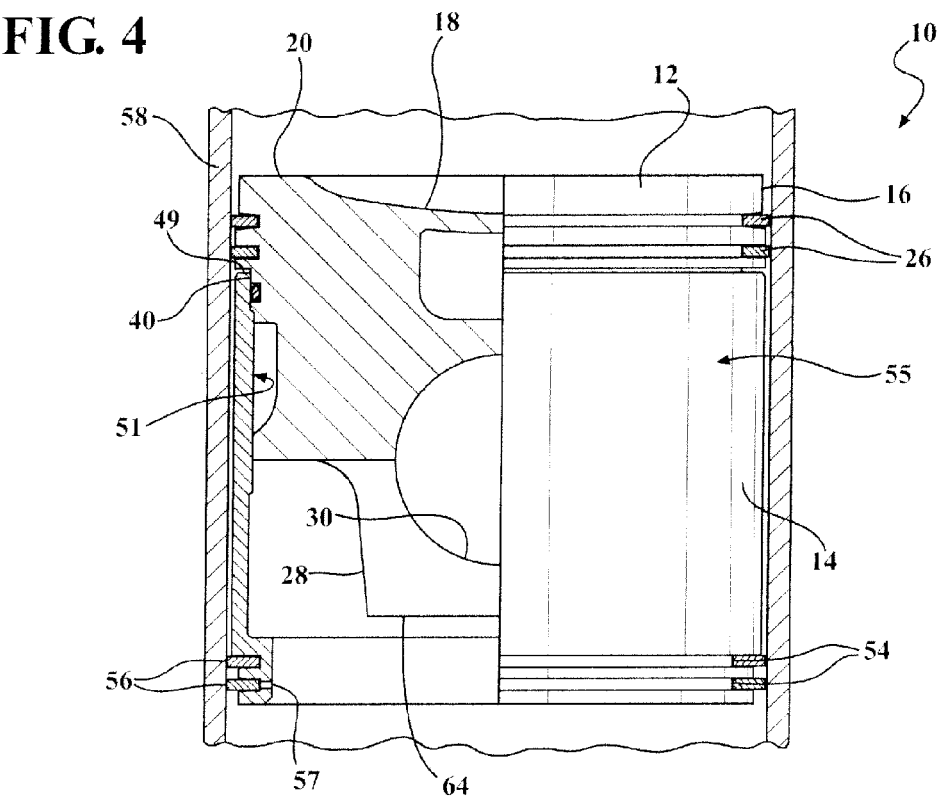
FIG. 4 is a partially sectioned view of the piston of FIG. 1 taken generally along the line 4-4 of FIG. 2.

Referring in more detail to the drawings, FIGS. 1-5 illustrate a piston assembly 10 for an internal combustion, ideally suited for a two-cycle engine, constructed in accordance with one embodiment of the invention. The piston assembly 10 includes a piston 12 and a skirt 14 fixed to one another. The piston 12 includes a piston head, also referred to as crown 16, having a combustion bowl 18 formed in an upper combustion surface, also referred to as top surface 20, of the piston 12 and a generally cylindrical outer surface, also referred to as ring belt 22, extending downwardly from the top surface 20. The ring belt 22 is formed having at least one, and shown as a plurality of annular ring grooves 24 (two illustrated) in which associated piston rings 26 may be disposed. At least one pin boss 28, and shown as a pair of pin bosses 28 in the exemplary embodiment, project downwardly from the crown 16. Each pin boss 28 is formed with an associated opening, also referred to as pin bore 30, for receiving ends of a wrist pin 32 for coupling the piston 12 to a connecting rod 34. The pin bores 30 are aligned with one another along a pin bore axis 35 extending between the pin bosses 28.

Figure 5:
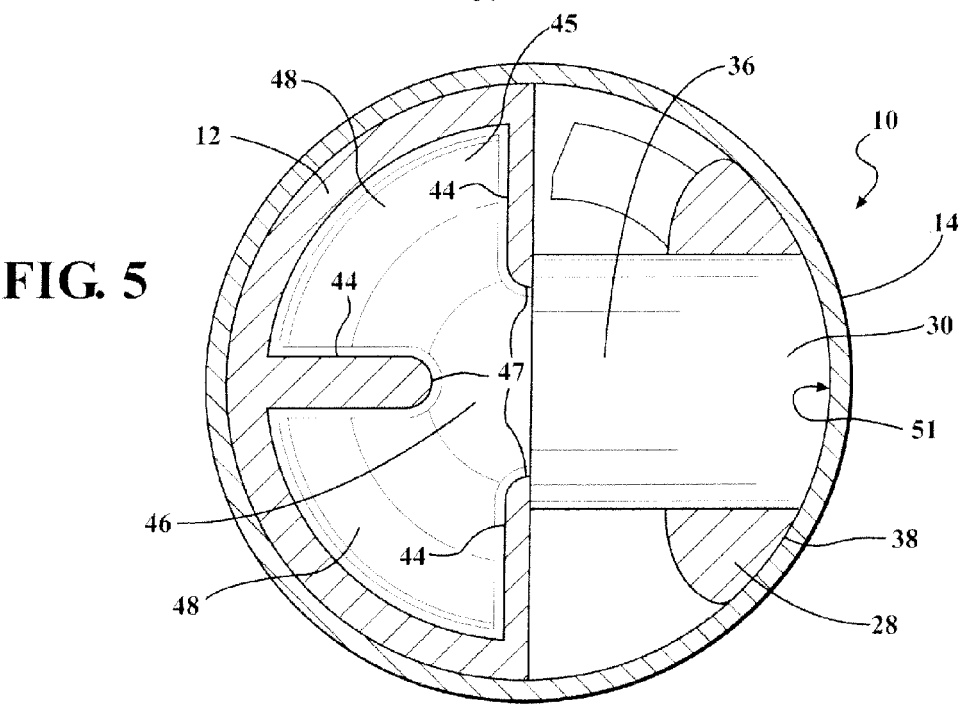
FIG. 5 is a partially sectioned view of the piston of FIG. 1 taken generally along the line 5-5 of FIG. 2.
Figure 6:
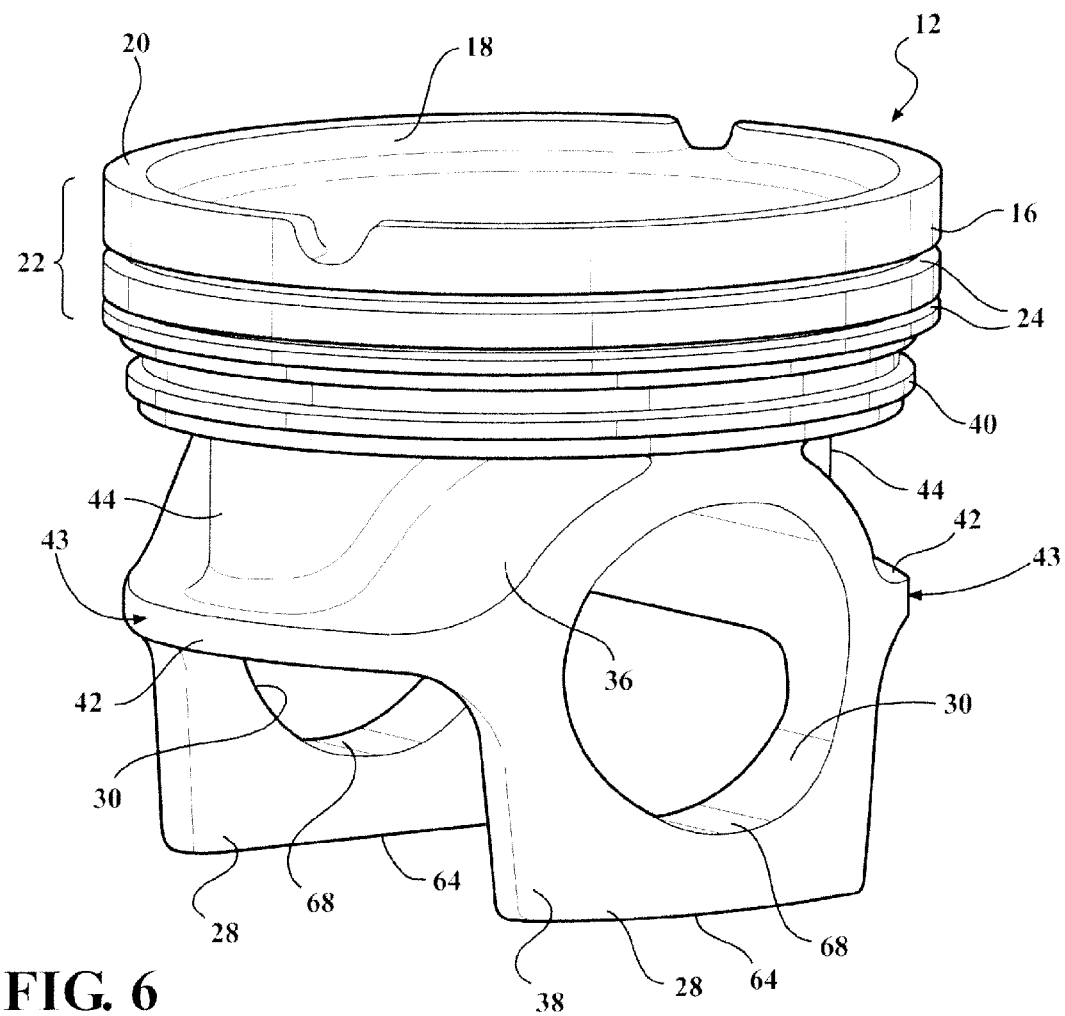
FIG. 6 is perspective view of a crown of the piston of FIG. 1.
Figure 7:
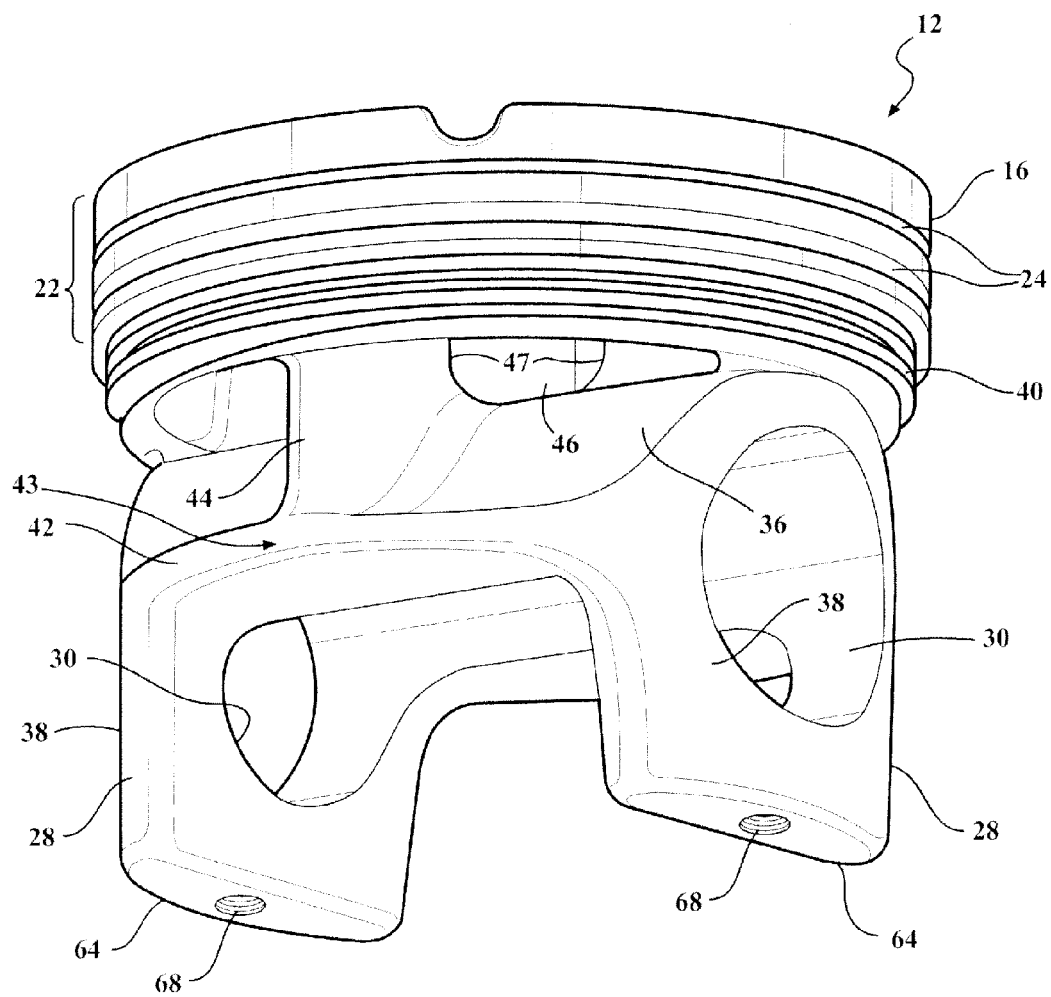
FIG. 7 is view similar to FIG. 6 taken from a different perspective.

The pin bores 30 have an upper sector forming a concave, cylindrical upper surface formed as a smooth continuation of a continuous concave, cylindrical top wall sector or portion 36, also referred to as saddle portion or intermediate wall, formed in the underside of the crown 16 in the manner of a cross-head piston. As such, the upper sectors of the pin bores 30 and the top wall portion 36 provide a smooth, continuous concave surface extending in axial and radial alignment with one another, such that the top wall portion 36 forms a load bearing extension of the upper sectors of the pin bores 30 for operatively supporting a wrist pin, and are closed laterally across the piston 12 between opposite radially outwardly facing side faces 38 of the pin bosses 28. As shown in FIGS. 6 and 7, the side faces 38 have enlarged cylindrical outer surfaces, which form an extension of a lower cylindrical radially inwardly stepped portion 40 the lower outer surface of the ring belt 22. The pin bosses 28 further include laterally extending ribs, also referred to as rib or web portions or lateral webs 42, extending between the side faces 38 of the pin bosses 28. The lateral webs 42 have convexly contoured outer surfaces 43 so as to form a smooth cylindrical continuation of the cylindrical surfaces formed by the side faces 38 and lower stepped portion 40. At least two longitudinal ribs, also referred to as gussets or longitudinal webs 44, extend axially upwardly from the lateral webs 42 (illustrated in FIGS. 6 and 7 as a single rib 44 extending from each of the diametrically opposite lateral webs 42 and bisecting the lateral webs 42 midway between the pin bosses 28) and join the top wall 36 of the pin bosses 28 and a lower wall surface, shown as an undercrown surface 45, which is opposite the top surface 20, of the piston crown 16 in the form of a gusset to provide enhanced structural support to the pin bosses 28 against unwanted deflection during extreme forces encountered to compression and combustion. As best shown in FIGS. 5 and 7, the upper portions of the longitudinal webs 44 in the region of the crown 16 extend radially inwardly from the reduced diameter or stepped down region 40 to radially inward edges 47 that are spaced laterally from one another. As such, the longitudinal webs 44 are spaced diametrically from one another and are also spaced laterally from the inner wall of the ring belt 22 so as to provide at least one center opening, also referred to as window 46, and two side openings, also referred to as windows 48, within the space of the piston crown 16 for the circulation of cooling oil during operation.

The piston 12 described and shown in FIGS. 1-7 is constructed a monolithic, single piece of material out of metal. The piston 12 may be cast as a single piece of steel, for example SAE 4140 grade of steel, and thus, the construction does not required additional separate components, and thus, the construction is economical. The piston 12 may alternatively be made of one piece of aluminum or another suitable material or materials and may be fabricated as a single piece by casting or other suitable means, such as forging, powder metal techniques, machining from a billet, etc.

Figure 8:
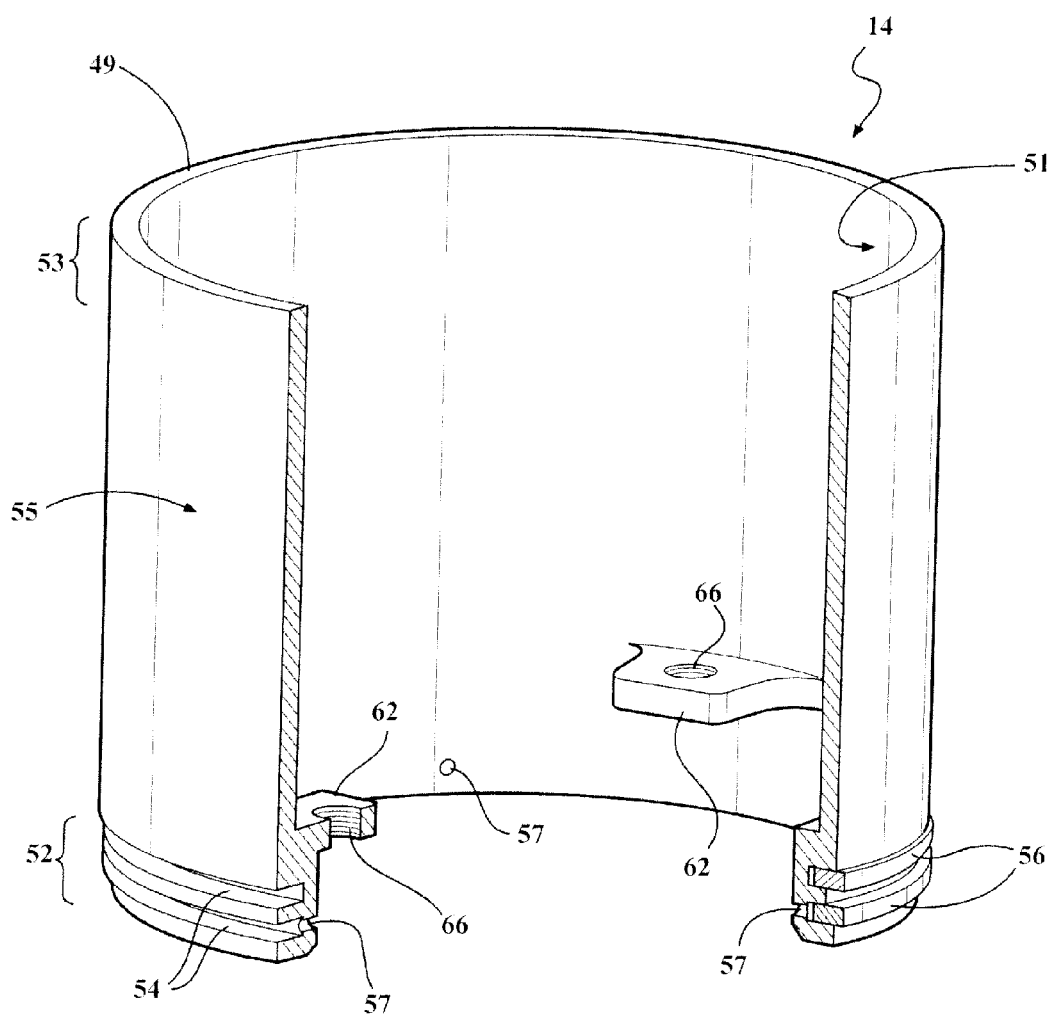
FIG. 8 is a partially sectioned perspective view of a skirt of the piston of FIG. 1.

As best shown in FIG. 8, the skirt 14 is generally cylindrical in configuration extending between a lower end portion 52 and an upper end portion 53. The upper end portion 53 is disposed over and about the pin bosses 28 and about the reduced diameter, stepped portion 40 below the crown 16. The skirt 14 has an upper free end 49 that is preferably pressed upwardly into abutting or close relation with an underside of the ring belt 22. The skirt 14 has an inner surface 51 with inner diameter corresponding for a line-to-line or very closely sized fit against the outer surface of the lower stepped portion 40 of the ring belt 22 (both generally cylindrical) such that the upper end portion 53 of the skirt 14 fits snugly about the lower stepped portion 40 of the ring belt 22 to form a seal fit, which can be facilitated by a seal member, shown as an o-ring adjacent the upper end 49. As such, given the diameter of the lower stepped portion 40 is generally the same as the diametrical dimension across the side faces 38 and across the lateral webs 42, a snug fit is also provided between the inner surface 51 of the skirt 14 and these surfaces 38, 42. The outer diameter of an outer surface 55 of the skirt 14 corresponds to the outer diameter of the ring belt 22 (both generally cylindrical), such that the outer surface 55 of the skirt 14 forms a smooth cylindrical extension of the ring belt 22 outer surface when attached to the crown 16. As mentioned, the outer dimension of the side faces 38 of the pin bosses 28 and lateral webs 42 conform to the inner dimension of the inner surface 51 of the piston skirt 14 (both generally cylindrical) such that the inner surface 51 of the skirt 14 engages the side faces 38 and lateral webs 42 of the piston 12 along thrust and anti-thrust directions when installed on the piston 12. In this manner, a large oil gallery is formed beneath the crown 16 which is closed off where the piston 12 meets the piston skirt 14 at the described contact regions. The skirt 14 may be fabricated of the same or different material as that of the piston 12. The skirt 14 is made as a separate piece of material from the piston 12 and the two parts 12, 14 are joined to one another so that they become fixed as one structure in operation.

The outer surface 55 of the lower end portion 52 of the skirt 14 may be formed with one or more annular ring grooves 54 in which associated rings 56 are disposed. The grooves 54 and rings 56 may be the same or similar in construction to the grooves 24 and rings 26 of the piston 12. The lowest groove 54 may be formed with drain holes 57 opening to the interior of the skirt 14 to enable oil that collects in the lowest groove to escape and drain to the interior of the skirt 14 and back into the crank case. The lower end portion 52 may have an increased radial wall thickness relative to the remaining portion of the skirt 14 (i.e., the lower end portion 52 may comprise a band region of the skirt that is thicker than the region above the upper end portion 53 covering the pin boss region 28). The increased thickness of the lower end portion 52 allows for formation of the ring grooves 54 in the lower portion 52. It will be seen that the lower set of rings 56 is spaced from the upper set of rings 26 and that the skirt 14 is free of any openings through its wall structure in the space extending between the ring sets 56, 26. In this way, when the piston assembly is installed in a piston cylinder bore, such as within a cylindrical liner 58 of an internal combustion engine 60, an oil and gas sealed region is formed between the ring sets 26, 56 by means of the rings 26, 56 engaging the inner surface 61 of the cylinder liner 58 during reciprocation of the piston assembly 10 within the cylinder liner 58.

The lower end portion 52 of the skirt 14 may include one or more mounting flanges, also referred to as lugs 62, shown as a pair, projecting radially inward from the inner surface 51 of the lower portion 52. The mounting lugs 62 are dimensioned and positioned on the skirt 14 to fit against a bottom surface 64 of the pin bosses 28. The lugs 62 may be formed with one or more openings 66 which align with corresponding threaded openings 68 extending into the bottom surfaces 64 of the pin bosses 28 to receive associated mounting fasteners, shown by way of example as threaded bolts 70, for securing the skirt 14 immovably on the piston 12. While the skirt 14 may be fixed to the piston 12 by threaded fasteners, as described, other ways of fixing the skirt 14 to the piston 12 are contemplated, including, but not limited to, welding, friction welding, brazing, screwing, gluing, pinning, etc.

Figure 9:
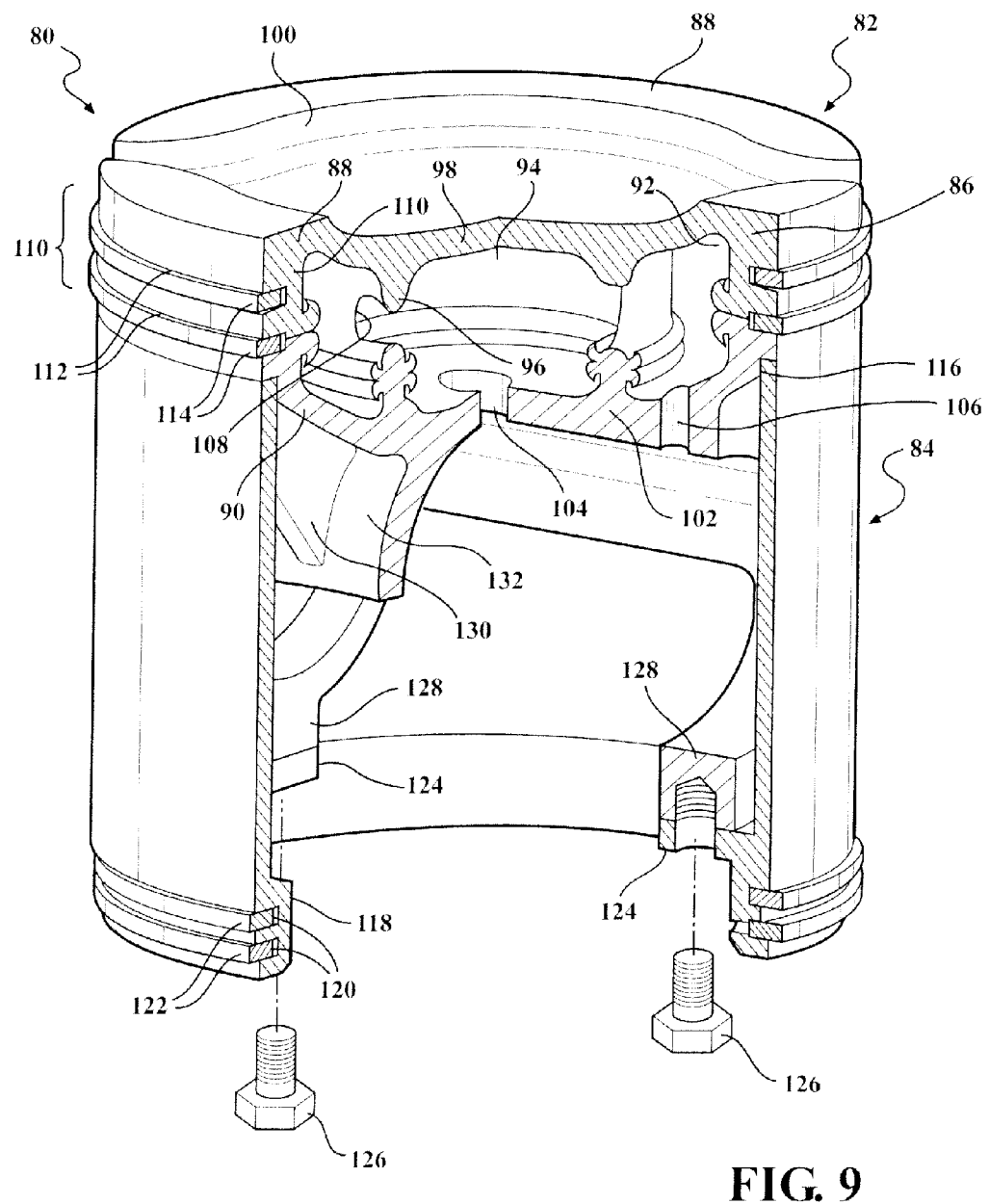
FIG. 9 is a partially sectioned view of a piston assembly constructed in accordance with another aspect of the invention.

FIG. 9 illustrates a piston assembly 80 constructed in accordance with another aspect of the invention. The piston assembly 80 is similar in construction and operation as that of the piston assembly 10 above of FIGS. 1-8, and includes a piston 82 and a separate skirt 84, but differs in that the piston 82 is formed with at least one cooling gallery in the crown 86 of the piston 80. It will be seen from the drawings that the crown 86 of the piston 82 may be formed initially of two separate pieces of material, including an upper portion 88 and a lower portion 90 of the crown 86, and then subsequently joined together. When the two separate portions 88, 90 are joined together, at least one and, as illustrated, two galleries or hollow regions 92, 94 are formed between the parts. These galleries 92, 94 may be in fluid flow communication with cooling oil during operation of the piston 82 to facilitate cooling of the piston 82 during operation. One or both galleries 92, 94 may be sealed and may include a sealed cooling medium within the space to enhance heat transfer away from the hottest regions of the piston (e.g., combustion bowl edge). The portions 88, 90 may be cast or forged and may be additionally machined to include the features that form the galleries 92, 94 when the parts 88, 90 are joined. Those skilled in the art will appreciate that there are any of a number of ways of constructing a multiple piece piston such that when the two or more parts are joined there results one or more cooling galleries within the piston structure. The exemplary piston 82 is fabricated of steel (cast or forged or powder metal or a combination) and its upper and lower parts 88, 90 are joined by friction welding. Other techniques may be employed to join the parts, including other welding techniques (resistance welding, induction welding, etc.); brazing, soldering, gluing, screwing, bolting, etc. The illustrated inner and outer galleries 94, 92 are separated by an annular inner wall 96 and include a top combustion wall 98 in which a combustion bowl 100 of the piston 82 may be provided, and a bottom wall 102. Openings 104, 106 are provided in the bottom wall 102 of the inner and outer galleries 92, 94 to accommodate the flow of oil into and out of the galleries 92, 94. Further openings 108 are provided in the inner wall 96 to provided fluid flow communication between the galleries 92, 94. The outer gallery 92 is bounded at its radially outer extent by an outer wall or ring belt 110 in which a plurality of ring grooves 112 may be provided for accommodating a corresponding plurality of associated piston rings 114.

Figure 10:
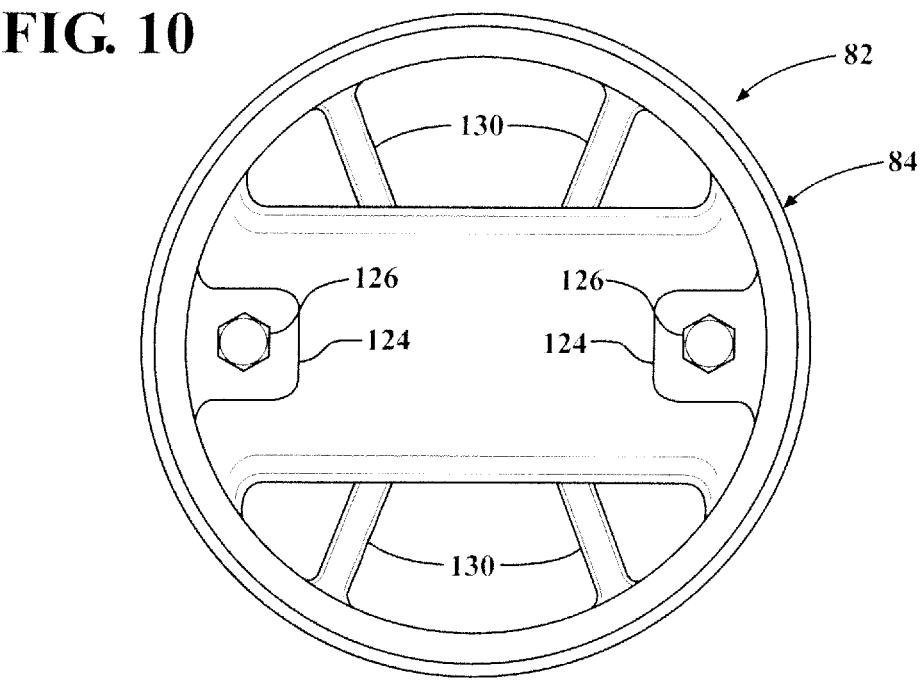
FIG. 10 is a bottom view of a piston of the assembly of FIG. 9 in accordance with one aspect of the invention.
Figure 10A:
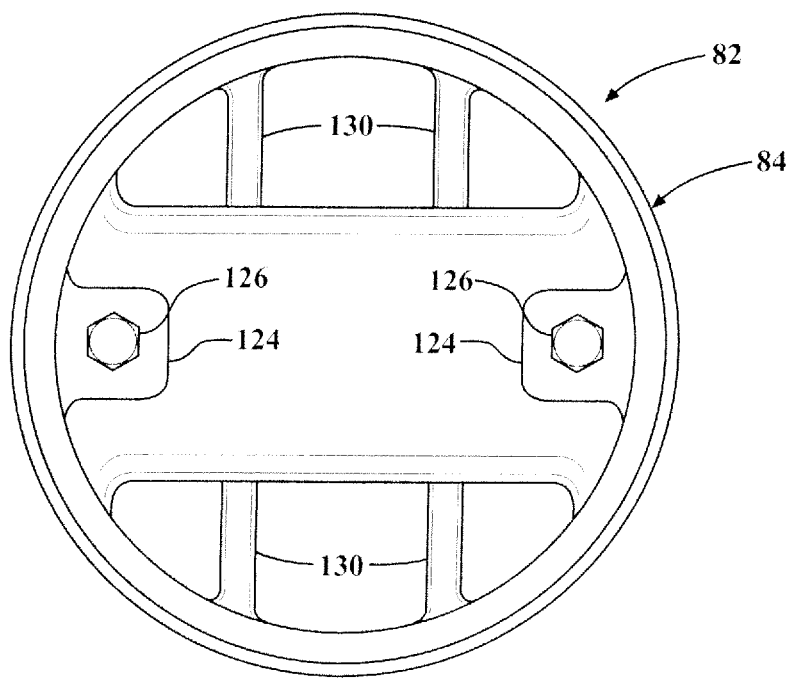
FIG. 10A is a bottom view of a piston of the assembly of FIG. 9 in accordance with another aspect of the invention.

The ring belt 110 has a stepped portion 116 of reduced diameter at it lower end. The upper end of the skirt 84 fits over the stepped portion 116 as discussed above with regard to the piston 12 and skirt 14, and thus, no further discussion is needed. A lower end portion 118 of the skirt 84 includes a plurality of ring grooves 120 similar to the ring grooves 54 discussed above, in which corresponding rings 122 are accommodated. The lower portion 118 is made the same as lower portion 52 of the first embodiment and the description thereof is incorporated herein by reference, including the provision of mounting lugs 124 (like those of lugs 62) which are secured by bolts 126 to the bottom of pin bosses 128 in the same manner as the first embodiment. As best shown in FIG. 10, the piston 82 further includes a pair of longitudinal ribs, also referred to as gussets or longitudinal webs 130 extend axially upwardly from a top wall 132 of the pin bosses 128 to the bottom or lower wall of the lower crown portion 90 in the form of a gusset to provide enhanced structural support to the pin bosses 128 against unwanted deflection during extreme forces encountered to compression and combustion. In the embodiment of FIG. 10, it can be seen that each of the longitudinal webs 130 of the separate pairs of longitudinal webs 130 on the opposite sides of the pin bore axis are formed in generally non-parallel, oblique relation with one another. In contrast, as shown in FIG. 10A, in accordance with another embodiment of the invention, it can be seen that each of the longitudinal webs 130 of the separate pairs of longitudinal webs 130 on the opposite sides of the pin bore axis can be formed in generally parallel relation with one another. Aside from the structural differences discussed above, the operation of the piston 82, apart from the addition of the oil gallery, is similar as that of the piston assembly 10 of the first embodiment.

The description is exemplary rather than limiting in nature. Variations and modifications to the disclosed embodiments may become apparent to those skilled in the art and come within the scope of the invention. The invention is defined and limited by the scope of any ultimately allowed claims.

Many modifications and variations of the present invention are possible in light of the above teachings. It is, therefore, to be understood that the invention may be practiced otherwise than as specifically described, and that the scope of the invention is defined by any ultimately allowed claims.

What is claimed is:

1. A piston assembly for an internal combustion engine, comprising:

a piston having an upper combustion surface and a lower wall surface beneath said upper combustion surface, with a pair of pin bosses formed with pin bores having concave bearing surfaces aligned axially and radially along a common pin bore axis and including an intermediate wall extending between said pin bosses, said intermediate wall having a concave bearing surface extending in axial and radial alignment with respective concave upper portions of said concave bearing surfaces of said pin bores so as to provide a load bearing extension of said concave upper portions for operatively supporting a wrist pin when installed in said pin bosses;

a skirt constructed as a separate piece of material from said piston, said skirt being fixed to said piston against relative movement and having a cylindrical wall with inner and outer cylindrical surfaces; and wherein said piston further includes at least one rib extending upwardly from said intermediate wall on opposite sides of said pin bore axis to said lower wall surface to provide structural support to said intermediate wall against unwanted deflection.

2. The piston assembly of claim 1 further including a pair of said ribs extending along each of said opposite sides.

3. The piston assembly of claim 2 wherein each said pair of ribs extend parallel to one another.

4. The piston assembly of claim 2 wherein each said pair of ribs extend in non-parallel relation to one another.

5. The piston assembly of claim 1 wherein said lower wall surface is an undercrown surface opposite said upper combustion surface and said piston further includes at least one laterally extending web extending between said pin bosses, said at least one rib extending upwardly from said at least one laterally extending web to said undercrown surface of said crown.

6. The piston assembly of claim 5 wherein said piston is a monolithic piece of material.

7. The piston assembly of claim 5 wherein said at least one laterally extending web extends along a plane passing through said pin bore axis.

8. The piston assembly of claim 5 wherein said at least one laterally extending web has a convexly contoured outer surface.

9. The piston assembly of claim 8 wherein said inner surface of said skirt abuts said convexly contoured outer surface of said at least one laterally extending web.

10. The piston assembly of claim 8 wherein said pin bosses have cylindrical, convex outer surfaces forming a smooth cylindrical continuation of said convexly contoured outer surface of said at least one laterally extending web.

11. The piston assembly of claim 9 wherein said inner surface of said skirt abuts said convexly contoured outer surface of said at least one laterally extending web and said cylindrical, convex outer surfaces of said pin bosses.

12. The piston assembly of claim 10 wherein said at least one laterally extending web includes a pair of laterally extending webs, said pair of laterally extending webs being diametrically opposite one another on opposite sides of said pin bore axis.

13. The piston assembly of claim 12 wherein said convexly contoured outer surfaces of said pair of laterally extending webs form a smooth cylindrical continuation of said cylindrical, convex outer surfaces of said pin bosses.

14. The piston assembly of claim 13 wherein said inner surface of said skirt abuts said convexly contoured outer surfaces of said pair of laterally extending webs and said cylindrical, convex outer surfaces of said pin bosses.

15. The piston assembly of claim 1 wherein said piston includes an upper portion and a lower portion, said upper and lower portions being constructed as separate pieces of material and subsequently joined together.

16. The piston assembly of claim 1 wherein said cylindrical wall of said skirt is cylindrically and circumferentially continuous.

* * * * *